Feb. 1, 1949. S. A. WINKELMANN 2,460,561
APPARATUS FOR CEMENTING WELLS
Filed Oct. 13, 1944 2 Sheets-Sheet 2

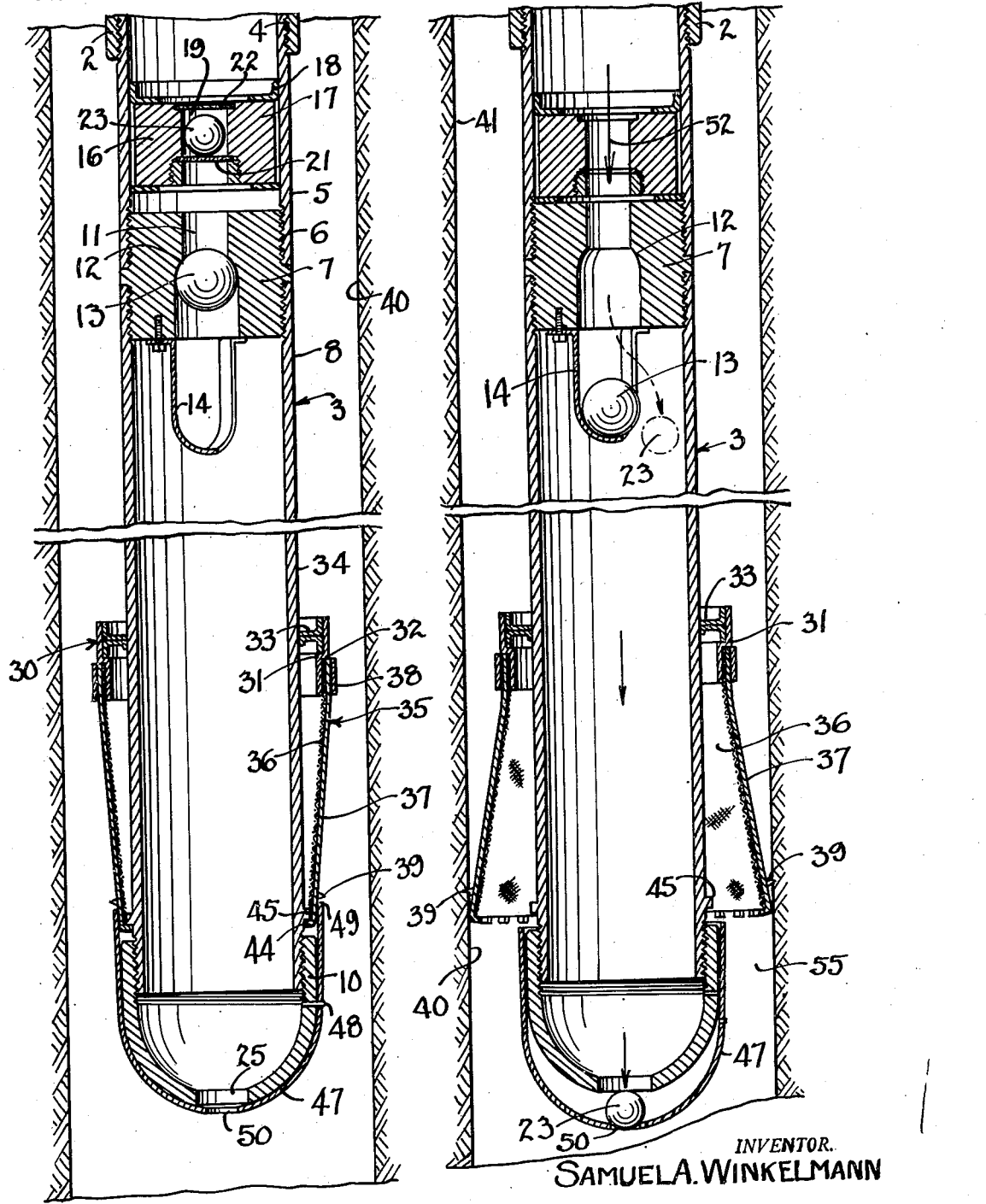

INVENTOR.
SAMUEL A. WINKELMANN
BY Lester B. Clarke,
ATTORNEY.

Patented Feb. 1, 1949

2,460,561

UNITED STATES PATENT OFFICE 2,460,561

APPARATUS FOR CEMENTING WELLS

Samuel A. Winkelmann, Houston, Tex., assignor of one-half to W. L. Goldston, Houston, Tex.

Application October 13, 1944, Serial No. 558,555

2 Claims. (Cl. 166—1)

The invention relates to a means for cementing pipe in wells.

The present invention contemplates the accurate positioning of the cement without channeling or contamination of the cement by drilling mud in the well.

Another object of the invention is to provide a skirt into which the cement being pumped out of the casing will be directed so that the skirt will form a barrier between the cement and the mud in the well and no cement may pass the skirt and no mud will contaminate the cement as the skirt moves along ahead of the cement.

Another object of the invention is to provide a barrier about the pipe in a well bore which will slide along the pipe under the pressure of the cement being introduced so as to displace the other liquid in the well, to wipe the pipe, and to scratch the formation so as to permit the cement to form a bond therewith.

Another object of the invention is to provide a cementing skirt comprising an annular ring supporting a flared skirt like portion which will scratch the surface of the well bore while the ring carries a portion to engage and wipe the pipe as it slides along.

Still another object of the invention is to provide a cementing assembly, including a float collar and guide shoe, a cementing skirt, and a releasable latch for the skirt.

Still another object of the invention is to provide a cementing skirt which will be released by the application of pressure to the cement and which will move along ahead of the cement to prevent contamination of the cement with the drilling mud.

Other and further objects of the invention will be readily apparent when the following description is considered in connection with the accompanying drawings, wherein:

Fig. 1 is a vertical sectional view of the cementing assembly as it is being lowered into the well bore.

Fig. 2 shows the cementing assembly with the cementing skirt being released.

Figure 3:
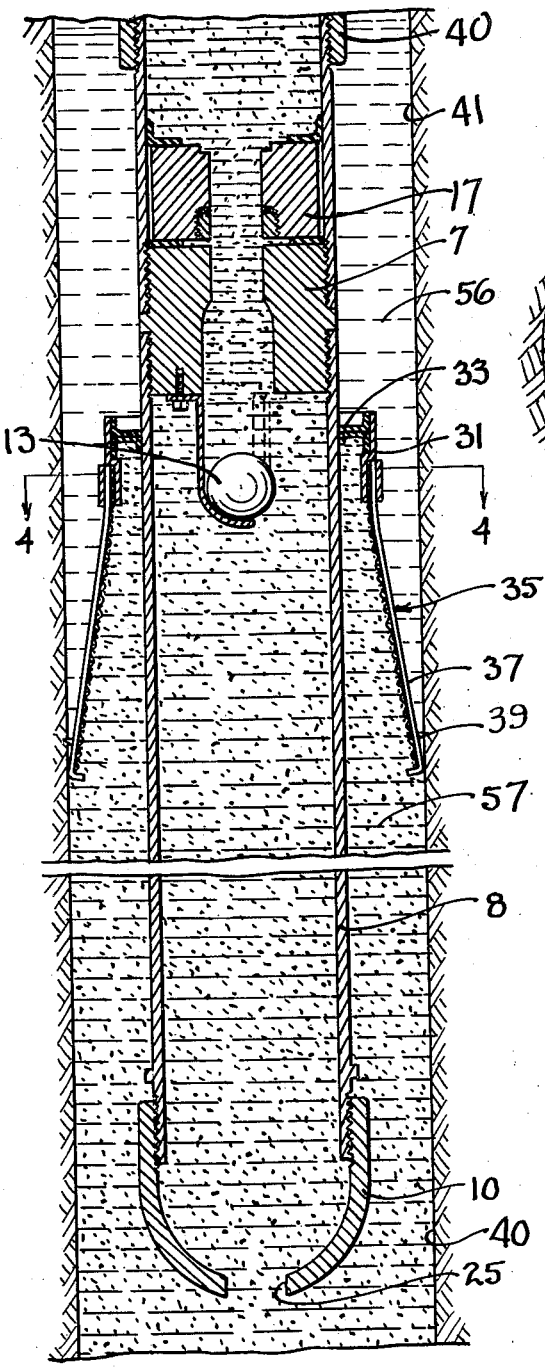
Fig. 3 shows the cementing assembly with pressure being applied to the cement, so as to effect movement of the skirt and displacement of the drilling mud by the cement.
Figure 4:
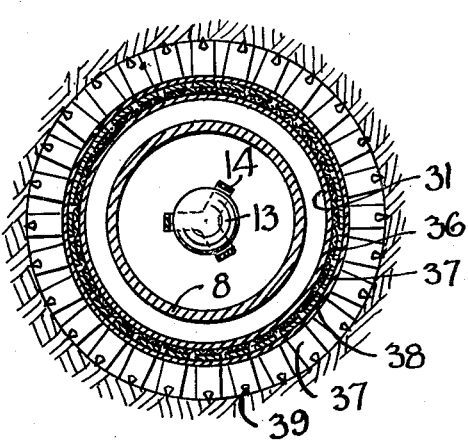
Fig. 4 is a section taken on the line 4—4 of Fig. 3.

In Fig. 1 a string of pipe or casing 2 is being lowered into the well bore and has a cement collar 3 threaded at 4 thereto.

This cement collar is part of a cementing assembly which is made up of a nipple 5 threaded at 6 to a back pressure valve body 7 which in turn has the pipe 8 threaded into it so as to support the guide shoe 10.

The back pressure valve body 7 has the passage 11 therethrough provided with a shoulder 12 to form a seat for the ball valve 13. In this manner, when there is a predominant pressure from below, the ball will remain in its seat as seen in Fig. 1. If, however, there is a predominant pressure from above, the ball 13 will move down into the cage 14 which serves to catch and retain the ball as seen in Fig. 2.

A means in the form of a scavenger plug 16 made up of a cylindrical body 17 and the wiper 18 has a vertical passage 19 therethrough. A pair of frangible disks 21 and 22 are carried in spaced relation closing the vertical passage 19. These disks confine a ball 23 between them and it will be noted that this ball is somewhat smaller than the check valve 13. Such ball acts as a cement retainer skirt release member as will be later described. The shoe 10 has a semi-spherical base portion having a passage 25 therethrough.

Arranged around the pipe portion 9 is a barrier or skirt 30 in the form of a ring or collar 31 which is offset at 32 to provide a seat for the wiper rings 33 of suitable flexible material, so as to wipe the peripheral surface 34 of the pipe 8 as the barrier slides along such surface. In this manner the surface 34 will be cleaned so as to facilitate the bonding of the cement thereto.

This support ring 31 carries a cementing skirt or barrier 35 which may also be designated as a cement retainer skirt which is made up of a flexible hollow frusto-conical member 36 which may be made of rubber, reinforced canvas, or any suitable fabric material which can be collapsed or folded in to the position in Fig. 1 or extended as seen in Fig. 2. This material may be reinforced by a plurality of spring fingers 37 anchored by a retainer ring 38 and which normally have a configuration shown in Fig. 2, but which may be collapsed to the position of Fig. 1. These fingers each carry a sharp prong 39 which is arranged to scrape into the surface 40 of the well bore 41, in which the assembly has been positioned.

These prongs are shown at 39 in Fig. 2 as penetrating the surface 40 so as to scratch the surface and roughen it so as to allow the cement to move into such areas to increase the bond of the cement with the wall of the well.

When the assembly is being lowered into the well, this skirt 35 will be collapsed as seen in Fig. 1 with the bent over ends 44 of the fingers 37 engaging underneath the rib 45 on the periphery of the pipe 8. This anchors the skirt from sliding movement along the pipe when the assembly is being lowered into the well.

In order to confine the skirt 35 as seen in Fig. 1, a false bottom, latch cap, or shield 47 is fitted over the shoe 10 and temporarily retained by a shear pin 48. This false bottom has its upper edge 49 over-lapping the lower ends of the fingers 37 so as to confine the skirt. The false bottom 47 has an opening 50 in the bottom thereof which is of a size to prevent the ball 23 from passing therethrough.

In actual operation, the pipe 2 and the cementing assembly will be connected together with the parts in the position in Fig. 1, except that the scavenger plug 16 may not be in position. As the pipe is floated into the well, the desired amount of liquid may be added in the form of water or drilling mud so that the desired flotation effect is obtained and the pipe 2 is prevented from collapse due to the pressure in the well bore.

Either before or when the pipe is landed at the proper point, the scavenger plug 16 can be introduced at the top and cement applied to the upper surface. As the cement is pumped in, the scavenger plug will move downwardly in the pipe 2 until it arrives at the position shown in Fig. 1. Any liquid in the pipe will unseat the valve 13 and pass out through the bottom openings 25 and 50. When the scavenger plug engages the float valve body 7, it will be prevented from further movement. The pressure on the cement will rupture the disks 21 and 22, driving the ball 23 downwardly until it strikes the float valve 13. The continuous pressure then moves the float valve 13 downwardly into the cage 14 and allows the ball 23 to pass outwardly through the cage around the valve 13. The cement continues down through the openings 19 and 11 as indicated by the arrow 52, in Fig. 2, the ball 23 will be forced downwardly through the opening 25 and is received in the opening 50 in the false bottom 47. The valve 23 thus closes the assembly but the continued application of pressure will shear the pin 48 and force the false bottom downwardly from over the ends of the fingers 37 so that the skirt 35 is released and will spring outwardly due to the provision of the spring fingers 37. The continued pressure causes the false bottom to move away from the shoe 10 and the cement will now discharge through the opening 25 into the area 55 which will fill with cement. The pressure is continued so that the cement will be forced into the skirt 35. As the cement continues to discharge, the movement of the cement will force the skirt or barrier upwardly along the pipe on top of the cement so that it forms a partition between the drilling mud 56 and the cement material 57 as best seen in Fig. 3.

The ring and skirt assembly tend to center the pipe in the well, the wiper rings 33 tend to clean the surface 34 of the pipe so that the cement will bond therewith, and the scratcher prongs 39 tend to scrape the surface 40 of the well bore, so that the cement will also bond with the earth formation.

One of the principal advantages of this skirt or barrier resides in the fact that none of the cement can pass the barrier, that the barrier is moved by the pressure on the cement and in this manner there can be no channeling of the cement through the drilling mud and there can be no contamination of the cement with drilling mud. The greater the pressure on the cement, the greater will be the tendency of the skirt to expand and ride along ahead of the cement.

What is claimed is:

1. The combination of a pipe in a well to be cemented and a cementing assembly including a float valve in the pipe, a latch release means above said valve but adapted to pass thereby upon the circulation of fluid under pressure past said valve, a slidable skirt about the pipe, means latching the skirt in collapsed position, said means being releasable by said latch release means in response to the movement of said latch release means thereagainst by fluid pressure.

2. A well cementing assembly attached to the lower end of a pipe comprising a guide shoe and float collar, a latch cap enclosing said guide shoe, a cementing skirt slidably arranged around said pipe and initially latched in collapsed position by said cap, an opening in said guide shoe and means movable through the shoe by the pressure applied to the cement to engage and detach said cap from the pipe and release said skirt so that such skirt opens to form a barrier between the cement discharged from said guide shoe and the fluid in the well and slides upwardly on top of the cement, and serves to confine the cement to center the pipe, to disperse the cement and to avoid channeling.

SAMUEL A. WINKELMANN.

REFERENCES CITED

The following references are of record in the file of this patent:

FOREIGN PATENTS

| Number | Country | Date |
|---|---|---|
| 2,150,310 | Baker | Mar. 14, 1939 |
| 2,212,086 | Thornhill | Aug. 20, 1940 |
| 2,263,566 | Boynton | Nov. 25, 1941 |
| 2,335,387 | Cantin | Nov. 30, 1943 |
| 2,344,120 | Baker | Mar. 14, 1944 |